US011392721B2

(12) United States Patent
Soryal

(10) Patent No.: US 11,392,721 B2
(45) Date of Patent: Jul. 19, 2022

(54) VIRTUAL MACHINE FORMJACKING PROTECTION

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 398 days.

(21) Appl. No.: 16/714,149

(22) Filed: Dec. 13, 2019

(65) Prior Publication Data

US 2021/0182411 A1 Jun. 17, 2021

(51) Int. Cl.
  *G06F 21/62* (2013.01)
  *G06F 9/455* (2018.01)
  *G06F 21/60* (2013.01)

(52) U.S. Cl.
  CPC ........ *G06F 21/629* (2013.01); *G06F 9/45558* (2013.01); *G06F 21/606* (2013.01); *G06F 2009/45562* (2013.01); *G06F 2009/45587* (2013.01)

(58) Field of Classification Search
  CPC .. G06F 21/629; G06F 9/45558; G06F 21/606; G06F 2009/45562; G06F 2009/45587; G06F 21/53
  See application file for complete search history.

(56) References Cited

U.S. PATENT DOCUMENTS

| | | | | |
|---|---|---|---|---|
| 6,654,949 B1 * | 11/2003 | Fraenkel | ............ | G06F 11/3466 717/124 |
| 8,505,094 B1 * | 8/2013 | Xuewen | ............ | H04L 63/1416 709/224 |
| 10,404,662 B1 * | 9/2019 | Ben-Dor | ................. | G06F 8/315 |
| 11,003,746 B1 * | 5/2021 | Vashishtha | .......... | H04L 63/1408 |
| 2008/0184225 A1 * | 7/2008 | Fitzgerald | .......... | G06F 9/45558 718/1 |
| 2009/0300359 A1 * | 12/2009 | Gao | .................... | H04L 63/1441 713/171 |
| 2017/0006046 A1 * | 1/2017 | Kuskov | ............... | H04L 63/1425 |
| 2017/0032118 A1 * | 2/2017 | Carson | .................. | G06F 21/566 |

(Continued)

OTHER PUBLICATIONS

Kaspersky, Internet Security 2019, "About protection of financial transactions and online purchases," Aug. 13, 2019.

(Continued)

*Primary Examiner* — Matthew Smithers

(57) ABSTRACT

A processing system may obtain from a client device an input to access an online form, where the client device is accessing a webpage via an application, the webpage being provided by the processing system and including an option to access the online form, and the input comprising a selection of the option. The processing system may further obtain from the client device a verification that an instantiation of a virtual machine on the client device is permitted for accessing the online form, provide to the client device a configuration code for instantiating the virtual machine, provide the online form to the virtual machine via the client device, where the virtual machine is instantiated on the client device in accordance with the configuration code, and where the virtual machine is distinct from the application, and obtain form data of the online form from the virtual machine via the client device.

20 Claims, 5 Drawing Sheets

(56) References Cited

U.S. PATENT DOCUMENTS

2020/0104488 A1* 4/2020 Li .................... G06F 40/221
2021/0176273 A1* 6/2021 Hales ................ G06F 16/986

OTHER PUBLICATIONS

Microsoft, "Why You Need AES (Advance Encryption Standard)".
Jessica Vomiero, "Formjacking: The newest way hackers are stealing credit card information," Global News, Mar. 3, 2019.
"Hackers Inject Skimmer Iframe in Shopping Sites to Steal Payment Information," TrendMicro, Security News, May 22, 2019.
Michael Kassner, "KeyScrambler: How keystroke encryption works to thwart keylogging threats," TechRepublic, Oct. 25, 2010.
"Magecart Attacks Grow Rampant in September," Wilders Security Forums, Discussion in 'other security issues & news' started by mood, Sep. 25, 2018.
"Microsoft unveils Windows Sandbox: Run any app in a disposable virtual machine," ARS Technica, ARS Staff, Dec. 19, 2018.
"Windows 10 will soon run Edge in a virtual machine to keep you safe," ARS Technica, ARS Staff, Sep. 26, 2016.
Wayne Rash, "You Need to Protect Your Website Against Formjacking Right Now," PC Mag, Feb. 27, 2019.

* cited by examiner

VIRTUAL MACHINE FORMJACKING PROTECTION

The present disclosure relates generally to formjacking mitigation and prevention techniques and more particularly to methods, computer-readable storage devices, and apparatuses for obtaining form data of an online form from a client device via a virtual machine, and to methods, computer-readable storage devices, and apparatuses for transmitting form data of an online form from a client device to a server via a virtual machine.

BACKGROUND

Formjacking refers to stealing information from online transactions, such as scraping credit card information during online payments. Formjacking may be accomplished via downloadable malicious code or via web-based hacking, which does not require any download of malicious software.

SUMMARY

In one example, the present disclosure describes a method, non-transitory computer-readable storage device, and apparatus for obtaining form data of an online form from a client device via a virtual machine. For instance, in one example, a processing system including at least one processor may obtain from a client device an input to access an online form, where the client device is accessing a webpage via an application of the client device, where the webpage is provided by the processing system and includes an option to access the online form, and where the input comprises a selection of the option to access the online form. The processing system may further obtain from the client device a verification that an instantiation of a virtual machine on the client device is permitted for accessing the online form, provide to the client device a configuration code for instantiating the virtual machine on the client device, provide the online form to the virtual machine via the client device, where the virtual machine is instantiated on the client device in accordance with the configuration code, and where the virtual machine is distinct from the application, and obtain form data of the online form from the virtual machine via the client device.

In another example, the present disclosure describes a method, non-transitory computer-readable storage device, and apparatus for transmitting form data to a server via a virtual machine. For instance, in one example, a processing system of a client device including at least one processor may obtain an input to access an online form, where the client device is accessing a webpage via an application of the client device, where the webpage is provided by a server and includes an option to access the online form, and where the input comprises a selection of the option to access the online form. The processing system may further submit the input to the server, obtain a configuration code from the server, where the configuration code is for instantiating a virtual machine on the client device, and instantiate the virtual machine in accordance with the configuration code, where the virtual machine is distinct from the application. The virtual machine may then present the online form via the processing system, obtaining form data of the online form via the processing system, and transmit the form data to the server via the processing system.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
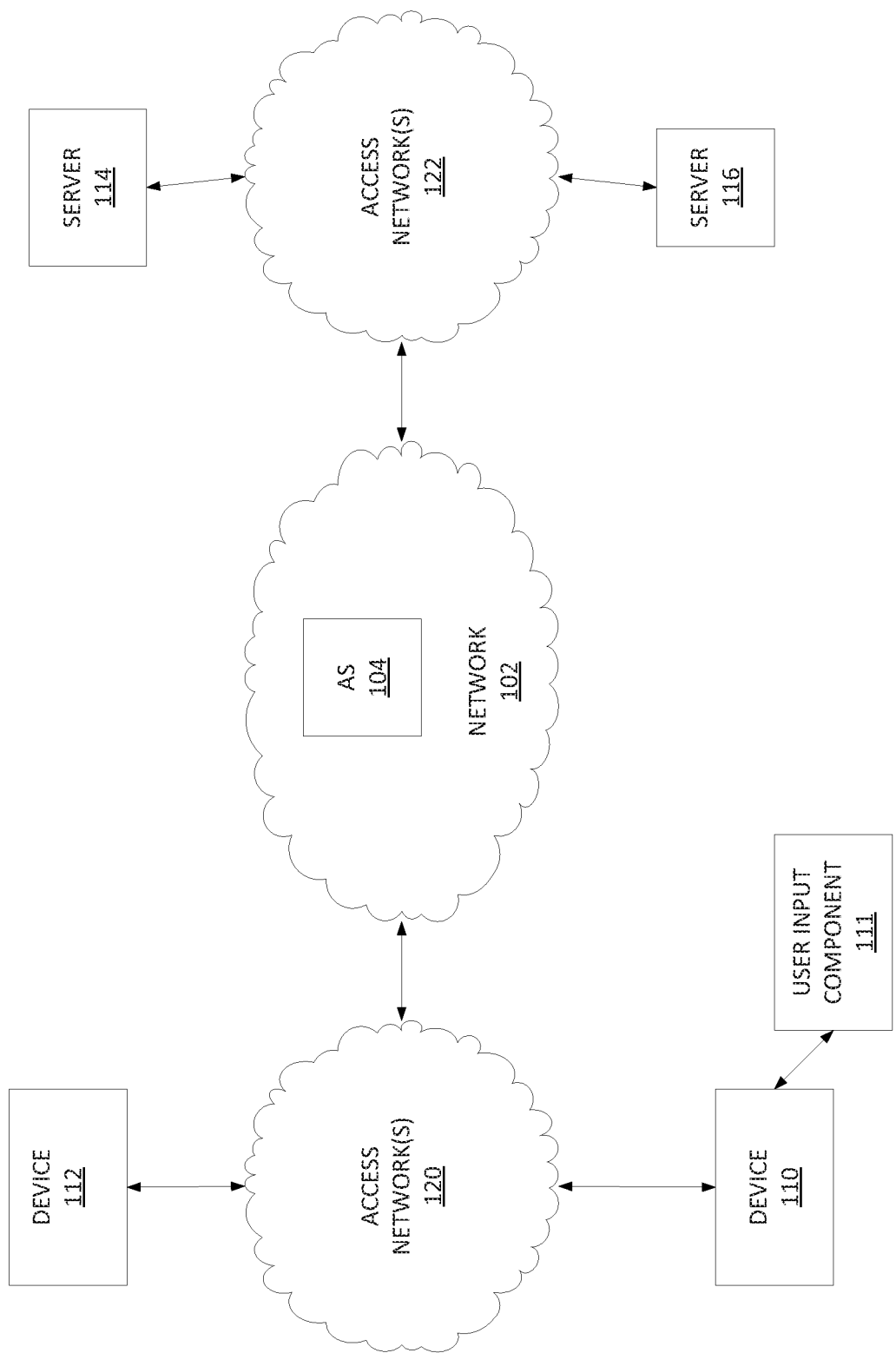
FIG. 1 illustrates an example system comprising one or more communication networks related to the present disclosure.

Formjacking is a prevalent problem that involves the stealing of information from online transactions, such as scraping credit card information during online payments and/or obtaining personal information submitted via an online form, such as addresses, dates of birth, social security numbers, medical information, banking account information, and so forth. Formjacking may be accomplished via downloadable malicious code or via web-based hacking, which does not require any download of malicious software. Examples of the present disclosure provide for mitigation and prevention of formjacking via the creation of a temporary virtual machine (VM) at a client device that provides a separate window (and process) for the submission of an online form and/or an online payment (e.g., that is separate from a main session for a client device's interactions with a web server). The temporary VM may use a separate and temporary key, or set of keys to secure a session between the VM and the server for the form submission that is different from the main session's key(s). In other words, the communications between the VM and the server may use a separate tunnel from a tunnel for the main session between the client device and the server, or may use a tunnel-within-a-tunnel. In one example, the temporary VM may be restricted to communicate with a single external address (e.g., a single external Internet Protocol (IP) address) to prevent the exfiltration of sensitive data of the online form to an unauthorized remote device. In one example, the temporary VM may utilize isolated processor, memory, and network interface card (NIC) resources that are not accessible to any other process or VMs on the same client device. In one example, one or more of: clipboard features, screen capture features, or the like may be disabled for the VM. In addition, in one example, the temporary VM may establish a secure connection to a controller of a user input component of the client device (e.g., a keyboard, a mouse, a joystick, a touch-screen, etc.), or multiple secure connections to respective controllers of a plurality of user input components, where each secure connection to a controller of a user input component uses a one-time scrambling code that is associated with the VM, and where data from the user input component is passed to the VM via the controller in accordance with the one-time scrambling code. For instance, the secure connection may be via a Universal Serial Bus (USB) bus, a Peripheral Component Interface (PCI) bus or PCI express (PCIe bus), a Small Computer System Interface (SCSI) bus, etc. Upon completion of the submission of the online form, the VM may be torn-down either in accordance with a self-configuration of the VM or via a notification or instruction from the server confirming the completion of the transaction.

To illustrate, an online shopper may click a button on a webpage to make a purchase (and enter payment information). In accordance with the present disclosure, a specialized VM is instantiated with a user interface to insert payment information. This temporary VM may be allocated physically isolated resources (processor, memory, NIC port, etc.). No other processes (or VMs) can use these physical resources until the VM is discarded when the payment is complete. In one example, a client-side process may estimate the resources required to run the VM. In one example, assigned resources may initially be determined based upon previous experience, and further resources may be dynamically allocated to the VM. In one example, the resources assigned to the VM are also logically separated from any other process. In one example, the VM establishes a separate secure connection to a server of the seller (via Transport Layer Security (TLS), Internet Protocol Security (IPSec), etc.).

To further illustrate, when the user clicks a link for payment, a request may be sent (e.g., with original session authentication credentials such as a session identifier (ID), TLS key(s), etc.) from the user's device to the server. Then a temporary (one time use) credential may be sent by the server to the user's device to be used for the VM's communications with the server. The information may be encrypted and sent from the VM (with different keys than the original session) in a tunnel to the seller's server. In one example, as part of the VM configuration, the NIC may be configured to utilize only one IP address (authorized host IP) for bi-directional communications. Accordingly, after authentication by the server, the server may send a single IP address (associated with the merchant) to the VM, and the NIC card resources of the VM may communicate with that single IP address. In one example, the destination IP address may be verified by the NIC (e.g., decrypted momentarily) by the method of allocating certain ports for the secure session. The NIC resources of the VM may send the form data in a tunnel to the single IP address. In one example, the IP address may be verified by a separate module, e.g., to prevent redirecting a copy to an unauthorized IP address.

When the VM is running, screen capture, clipboard, and similar features may be disabled. In addition, the VM may be provided exclusive control of the keyboard and mouse to prevent keyloggers. In one example, the signals coming from the keyboard, mouse, and/or other user interface components are shuffled. For instance, a user may press the letter "K", and the VM may manipulate the signal to appear to be coming from a key press of another letter. Then, the VM may adjust it back to letter "K." To accomplish this, the VM may establish a secure connection to the keyboard controller (or a controller of another user input component) and may temporarily control the outputs of the keyboard buss(es) to alter the values (letters, number, or other characters), transport the scrambled signals securely to the VM (e.g., to the dedicated memory resources of the VM), and then revert these characters back to their intended values.

If malicious code resides on the client device to steal the payment information, with the existence of the present protection tool, the malicious code may be prevented from: infiltrating the payment process during all steps, monitoring values entered via a user input component, taking screen shots, seeing what is being sent/received on the NIC since the VM portion is logically isolated, directing or copying traffic to another IP address since the NIC portion of the VM is configured to send to (and receive from) one IP address, unencrypting the session (man-in-the-middle attack), since a new authentication credential (one time pad) is used, and so forth. These and other aspects of the present disclosure are described in greater detail below in connection with the examples of FIGS. 1-5.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access networks 120 may be in communication with one or more devices 110 and 112. Similarly, access networks 122 may be in communication with one or more devices, e.g., servers 114 and 116. Access networks 120 and 122 may transmit and receive communications between devices 110 and 112, servers 114 and 116, application server (AS) 104 and/or other components of network 102, devices reachable via the Internet in general, and so forth. In one example, each of the devices 110 and 112 may comprise any single device or combination of devices that may comprise an endpoint device, e.g., a client device. For example, the devices 110 and 112 may each comprise a mobile device, a cellular smart phone, a laptop, a tablet computer, a desktop computer, a wearable computing device, an application server, a bank or cluster of such devices, an IoT device, and the like. However, it should be noted that in one example, either or both of devices 110 and 112 may instead comprise a cloud desktop, or the like, wherein the "client device" may comprise network-based computing resources that are allocated to a user and which may provide for an operating system and a suite of applications which may provide similar functions to a desktop computer, a laptop computer, a mobile computing device, etc.

Figure 4:
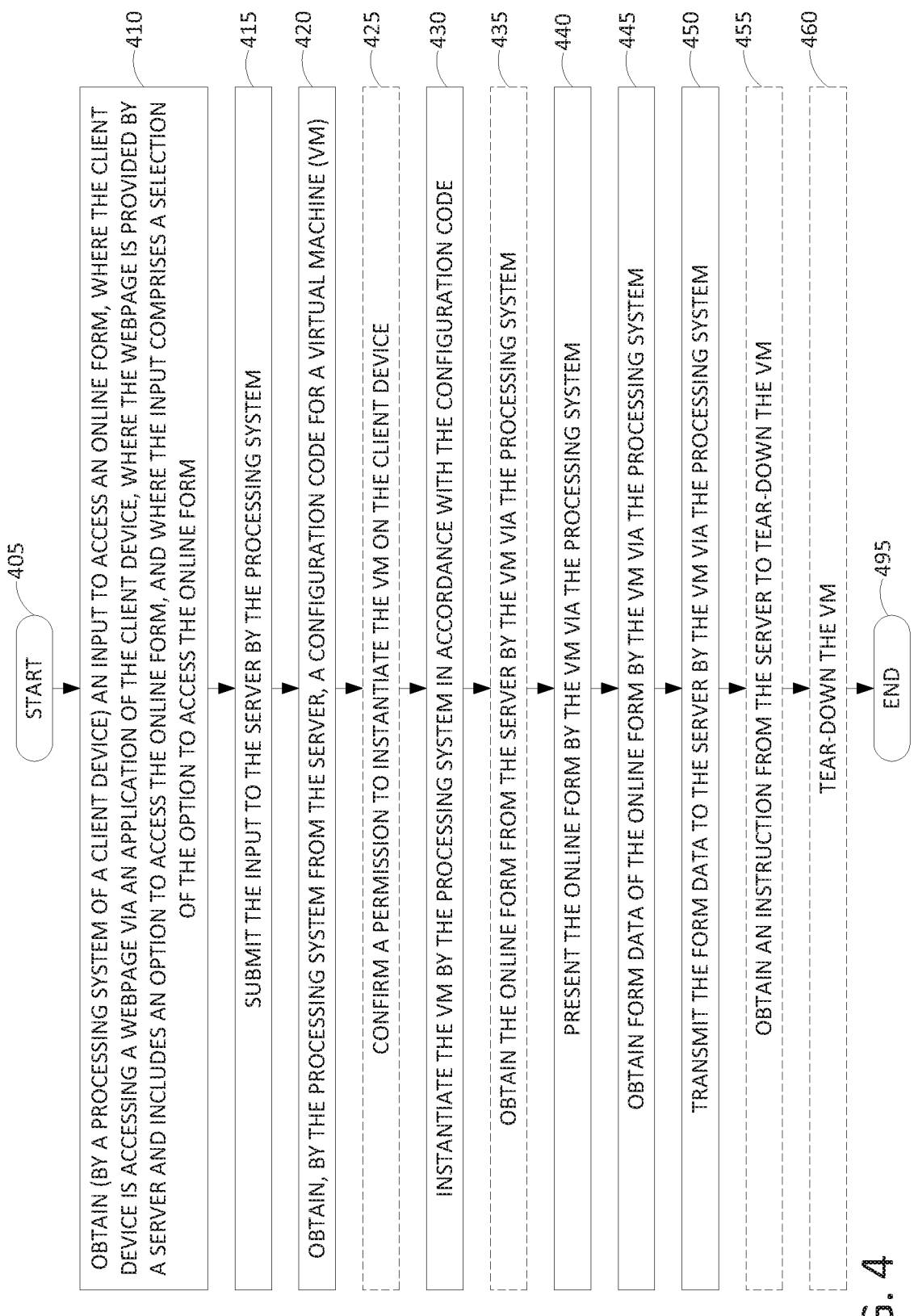
FIG. 4 illustrates a flowchart of an example method for transmitting form data of an online form to a server via a virtual machine.
Figure 5:
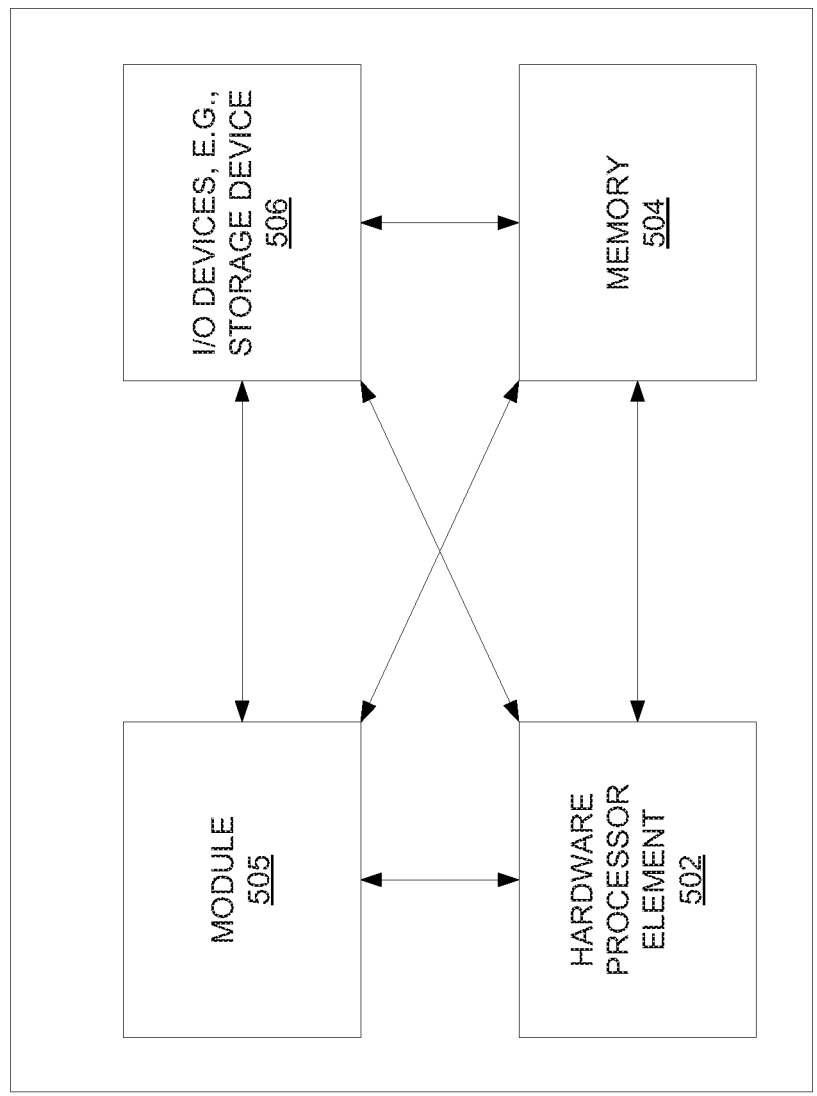
FIG. 5 illustrates a high level block diagram of a computing device specifically programmed to perform the steps, functions, blocks and/or operations described herein.

In one example, any one or more of devices 110 and 112 may comprise a computing device or processing system, such as computing system 500 depicted in FIG. 5, and may be configured to provide one or more operations or functions for transmitting form data of an online form from a client device to a server via a virtual machine. A flowchart of an example method 400 for transmitting form data of an online form from a client device to a server via a virtual machine is illustrated in FIG. 4 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In addition, as referred to herein, "configuration code" may comprise computer-readable/computer-executable instructions, or code, which when executed by a processor, or processors, of the processing system within a same device or within distributed devices, may cause the processing system to perform various functions. For example, "configuration code" may include functions, procedures, rules, or the like, and may be expressed in one or more programming languages, and/or may be maintained as one or more binary files (e.g., executables). "Configuration code" may also include variables, data values, tables, objects, libraries, or other data structures or the like which may cause a processing system executing computer-readable instructions/code to function differently depending upon the values of the variables or other data structures that are provided. Configuration code may comprise a package of multiple associated files that when accessed and/or executed by a processing system, cause the processing system to provide a particular function. For instance, in one example, the present disclosure may include providing configuration code from a server to a client device for the instantiation of a specialized VM for sensitive aspects of an online transaction (e.g., online form submission).

Figure 3:
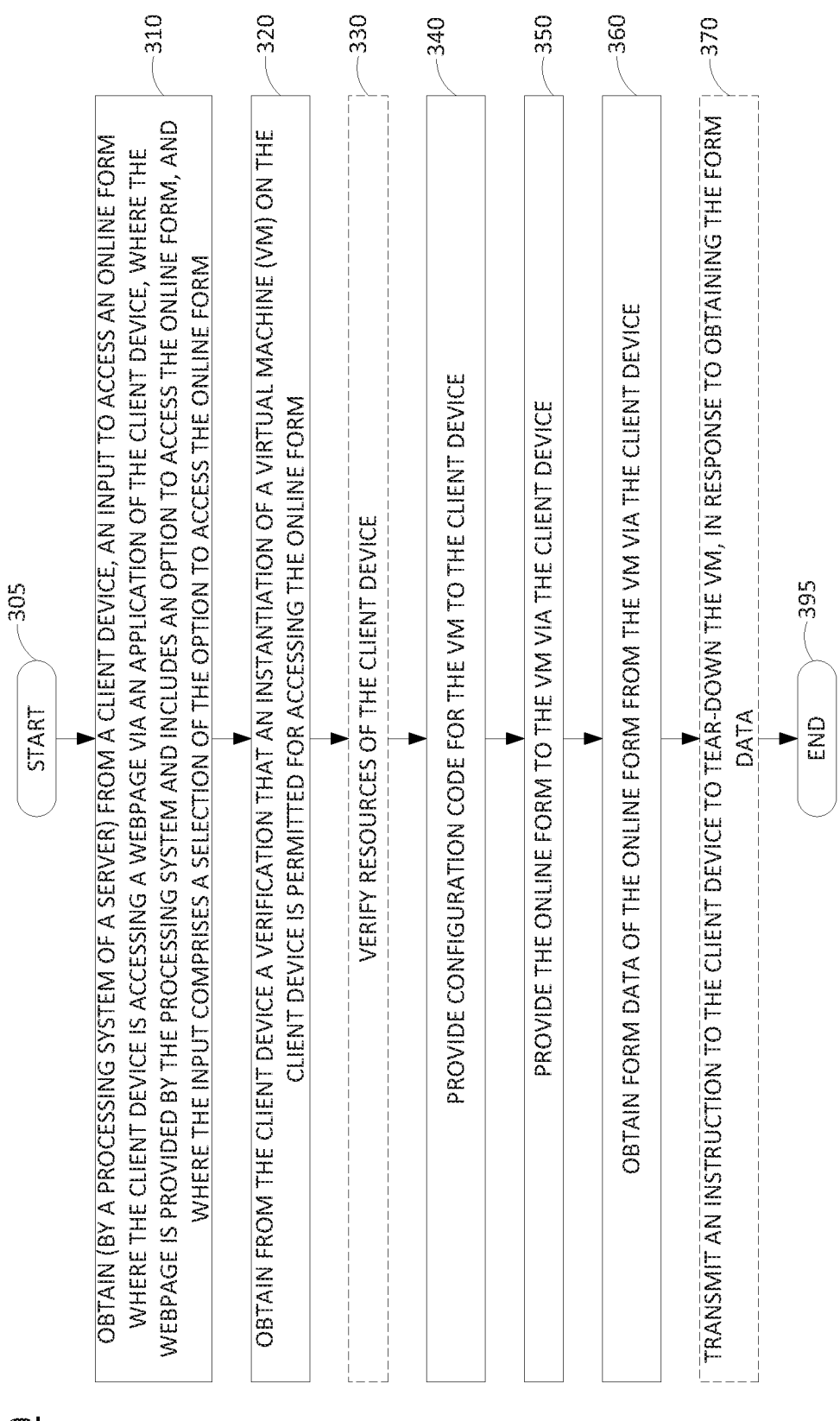
FIG. 3 illustrates a flowchart of an example method for obtaining form data of an online form from a client device via a virtual machine.

Similarly, servers 114 and 116 may each comprise a computing system or server, such as computing system 500 depicted in FIG. 5, and may be configured to provide one or more operations or functions in connection with examples of the present disclosure for obtaining form data of an online form from a client device via a virtual machine. An example method 300 for obtaining form data of an online form from a client device via a virtual machine is illustrated in FIG. 3 and described in greater detail below.

In one example, AS 104 may comprise a network-based security server for obtaining form data of an online form from a client device via a virtual machine. In this regard, AS 104 may comprise the same or similar components as those of server 114 and/or server 116 and may provide the same or similar functions. Thus, any examples described herein with respect to server 114 and/or server 116 may similarly apply to AS 104, and vice versa. For instance, an operator of network 102 may provide an online form processing service (e.g., for online payments or other transactions) via AS 104 in accordance with the present disclosure (e.g., in addition to telecommunication services such as TV, phone, internet access, etc., as described above).

It should be noted that either of devices 110 or 112 may also comprise a device of an attacker that is intent upon gaining unauthorized access to data of an online form. To illustrate, device 110 may comprise a client that is accessing a website provided via server 114, such as web server of an online merchant. A user, via the client (device 110) may place one or more items in an online shopping cart and may then attempt to check-out and pay for the item(s), which may involve the filling-out and submission of one or more online forms, e.g., to enter purchaser information, such as name, phone number, email address, etc., to enter payment information, such as a credit card number, expiration date, billing address, etc., to enter shipping information, and so forth. In the present example, a potential bad actor may utilize device 112 to initiate a formjacking attempt over one or more networks and may attempt to place malicious code on the client (device 110). Alternatively or in addition, device 110 may already be infected with malicious code that is in operation and that is waiting for a transaction involving an online form so that the form data may be stolen internally at device 110. In another example, device 112 may attempt to steal the online form data in-transit, e.g., via a man-in-themiddle attack at one or more compromised intermediate devices, such as routers in access networks 120, network 102, etc. For instance, device 112 may attempt to break encryption and gain access to the raw form data to steal credit card information or other sensitive information, and so forth.

However, in accordance with the present disclosure, device 110 and server 114 may protect aspects of the client interaction with the merchant (e.g., the online form submission) via a specialized temporary VM, as described herein. In one example, a main interaction with server 114 may involve a user selecting to proceed to an aspect of the online transaction that involves the submission of a form. For instance, on a shopping webpage, device 110 may present a button to check-out, which may be selected by a user of device 110. Upon selecting this button, or via a similar user input, device 110 may transmit a notification to server 114. In response, server 114 may serve a page, a script, or the like to device 110 to present the user with a request to authorize the instantiation of a temporary VM. In accordance with the request, device 110 may present selectable buttons (or the like), for a user of device 110 to allow or deny the instantiation of the temporary VM. If authorized, server 110 may download to device 110 a configuration code (e.g., an executable package) for the temporary VM. Device 110 may then instantiate the VM in accordance with the configuration code. In one example, device 110 may present an additional authorization choice to a user of device 110 (e.g., via an InstallShield check, such as: "Do you want to allow this program to make changes to your computer?" or the like).

In one example, the VM may be instantiated by a hypervisor, or virtual machine monitor (VMM), that is running on device 110. It should be noted that there are two primary types of hypervisor/VMM-based computing device virtualization architectures. The first comprises a VMM, also referred to as a hypervisor, which is installed at a logical layer directly on top of the device hardware. The hypervisor accesses the device hardware via a designated hardware interface, such as Industry Standard Architecture (ISA) hardware interface. The hypervisor presents a virtual hardware interface to one or more guest operating systems, or containers. From the perspective of the guest operating systems, VMs, and/or containers, it appears as if the interactions are directly with the device hardware via the hardware interface. The guest operating systems, VMs, or containers may be unaware that the device hardware has been virtualized, and possibly shared among several guest operating systems, VMs, and/or containers.

The second type of hypervisor/VMM-based device virtualization architecture involves the hypervisor, or VMM, installed at a logical layer between a host operating system and one or more guest operating systems, or containers. The hypervisor accesses device hardware through privileged calls via the host operating system. Similar to the first type of virtualization architecture, the hypervisor in the second type of device virtualization also presents a virtual hardware interface to the guest operating system(s), VM(s), and/or container(s). It should be noted that in other examples, a different type of a controlling application/layer may be utilized, such as a container engine (e.g., a Docker engine, lmctfy, libcontainer, or the like). For instance, in such examples, instead of a VM, a "container" or similar virtualized component may be instantiated.

In any event, once instantiated, the VM may be configured to present a separate window for the filling out and submission of one or more online forms (e.g., the purchaser information, credit card information, shipping information, etc.). In one example, the forms may be included in the VM configuration code. In another example, device 110 may obtain the forms via the temporary VM after the VM is instantiated. For instance, the temporary VM may request the form(s) from server 114 and/or server 116. In this regard, it should be noted that in one example, the online form obtaining and/or submission may involve a different server from a server that is associated with the main transaction. For instance, device 110 may be redirected by server 114 to server 116 obtain the online form(s) and/or to complete the online form(s) submission.

As noted above, the VM may utilize a separately secured session for the online form submission, e.g., a separate tunnel or a tunnel-within-a-tunnel having a different set of encryption keys. For instance, a tunnel between the VM and the server 116 may be established where the encryption keys (e.g., for Transport Layer Security (TLS), or the like) are held by resources of the VM that are isolated from the rest of the client device. In such case, inbound data of the session may be received via the NIC, passed to the CPU, and accessed by the hypervisor. The hypervisor may place the inbound data in a portion of the memory dedicated to the VM, where the VM processor resources may then access and act upon the received data (e.g., to decrypt the data and otherwise utilize the data once decrypted). In another example, such as where the device 110 utilizes single-root input/output virtualization (SR-IOV), the NIC (and/or an input/output memory management unit (IOMMU)) may place the encrypted data in the isolated memory resources of the device 110 (e.g., bypassing a software switch layer of the hypervisor).

The VM may also be prevented from utilizing a clipboard feature, a screen capture feature, and/or other similar features of device 110. In addition, in one example, the VM may utilize a secure connection to a controller (e.g., an embedded microcontroller) of a user input component 111 of the device 110 (e.g., a keyboard, a mouse, a touchscreen, or the like), where the secure connection to the controller may use a one-time scrambling code that is associated with the VM, and where data from the user input component is passed to the VM via the controller in accordance with the one-time scrambling code. Accordingly, the filling-out of any online forms via the temporary VM instantiated on device 110 may be protected from keystroke loggers (including possible physical keystroke loggers that may be embedded directly on the user input component 111, possible keystroke loggers that may attempt to steal keyboard data over-the-air, e.g., if user input component 111 is a wireless keyboard, and so forth).

As noted above, the temporary VM may be configured to communicate with a single external IP address (e.g., an IP address that is associated with server 114 or server 116). As such, even if malicious code may access the online form data via the temporary VM, any attempt at external transmission, e.g., to device 112 or to another device under the control of an attacker, may be prevented. In one example, the VM may obtain and present multiple online forms, and may upload multiple online forms back to server 114 and/or server 116. Upon completion of the sensitive aspects of the online interaction (e.g., when submission of no additional online forms is required, such as when a payment transaction is complete), device 110 may tear down the temporary VM. For instance, the temporary VM may be configured to self-shut down upon a completion of a transaction for which it is designed. Alternatively, or in addition, server 114 and/or server 116 may send a notification or an instruction to close the VM upon confirmation that the sensitive aspects of the online transaction are complete. In still another example, for added protection the temporary VM may be configured with an internal timer such that upon expiration of a particular duration of time, the VM may self-shut down (e.g., regardless of whether sensitive aspects of the online transaction are complete or not). Similarly, device 110 may be configured to wind-down the temporary VM after passage of a particular amount of time. For instance, a hypervisor, or VMM, of device 110 may set a maximum life for the temporary VM which may be imposed by device 110, regardless of any internal configuration of the temporary VM in accordance with its configuration code.

It should be noted that the foregoing describes just one illustrative scenario of how the system 100 may be used in connection with examples of the present disclosure for obtaining form data of an online form from a client device via a virtual machine and/or for transmitting form data of an online form from a client device to a server via a virtual machine. In addition, further details, such as example user interface aspects of transactions including online forms are illustrated in FIG. 2.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server 114 and server 116 may reach network 102 via different access networks, devices 110 and 112 may reach network 102 via different access networks, and so forth. Thus, these and other modifications are all contemplated within the scope of the present disclosure.

Figure 2:
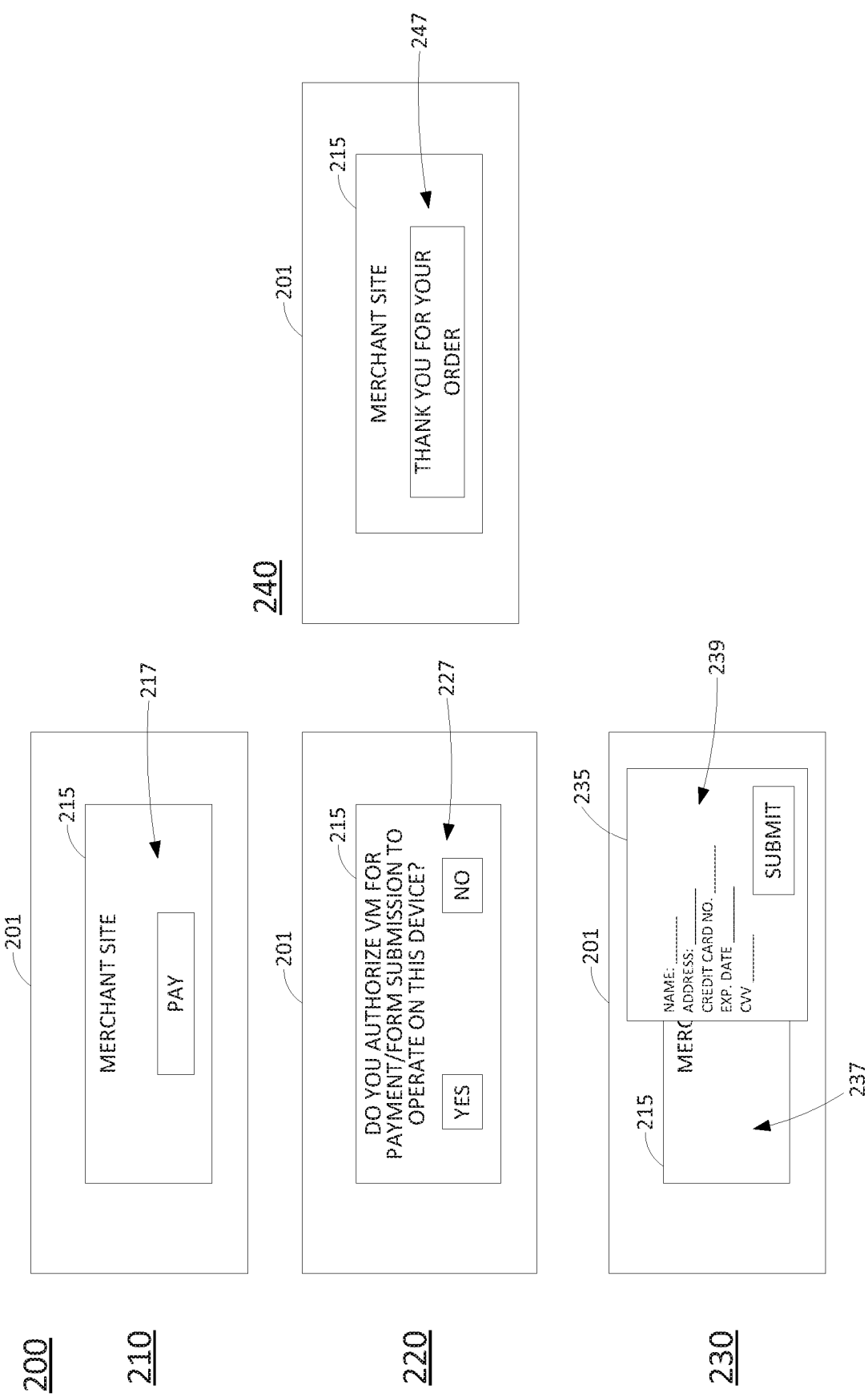
FIG. 2 illustrates an example user interface sequence for an online form submission, in accordance with the present disclosure.

To further illustrate aspects of the present disclosure, FIG. 2 depicts an example user interface sequence 200 for an online form submission. The user interface sequence 200 includes operations or "stages" 210, 220, 230, and 240 relating to a display screen 201 of a client device. At stage 210, the display screen 201 presents a window 215 that includes a "pay" button 217, which when clicked, may cause the sequence to proceed to stage 220. For instance, the window 215 may present at least a portion of a merchant website. Therefore, assuming that the "pay" button 217 is selected by a user, e.g., via a mouse, a touchscreen, etc., the sequence 200 proceeds to stage 220. At stage 220, the window 215 presents an authorization request 227 with two buttons, "yes" or "no," to select whether to allow a virtual machine (VM) for payment/form submission to operate on the client device. In one example, the authorization request may be obtained from a server in response to the selection of the "pay" button 217 at stage 210. If the user selects the "no" button, the sequence 200 may end. However, when the user selects the "yes" button, the sequence 200 may proceed to stage 230.

At stage 230, a new window 235 is displayed and presents an online form 239 (e.g., a credit card payment form). In accordance with the present disclosure, the window 235 may be dedicated to the VM. For instance, in response to selecting the "yes" button, a notification may be provided to the server, upon which the server may transmit a configuration code for the VM to be instantiated on the client device. As discussed above, when the VM is in operation, screen capture, clipboard, and similar features of the client device may be disabled. In addition, the VM may establish a secure connection to any user input components of the client device via which a user may input data into the online form 239, select the "submit" button, etc. Upon selection of the "submit" button presented in window 235, the data that is input to the online form 239 may be transmitted to the server via a secure tunnel that utilizes a different set of encryption keys from a main session between the client device and the server associated with the merchant website. In addition, upon submission of the form data, the VM may be torn-down and released from the client device. In one example, the memory resources of the VM may be overwritten, e.g., as all zeros, all ones, or some other patterns via which the prior memory contents may be irretrievably lost.

At stage 240, the window 215 presents a confirmation message 247, e.g., "thank you for your order." In one example, a user, via the client device, may continue to interact with the merchant website, such as shopping for additional merchandise, etc., or may close the window 215. It should be noted that underlying the sequence 200 are several interactions between the client device and the server as described herein, such as: transmitting information from the client device to the sever regarding the selection of certain buttons, transmitting a webpage and/or script from the server to the client device for confirming authorization to load and run a VM at the client device, transmitting from the server to the client device the configuration code for the VM, submitting a completed online form from the client device to the server, and so on. In addition, in accordance with the configuration code of the VM, the client device may allocate dedicated and restricted processor resources, memory resources, and NIC resources to the VM, may establish a secure connection to the user input component(s), may establish a secure tunnel between the VM and the server (that is separate from a tunnel for a main session between the client device and the server (and/or a tunnel-within-a-tunnel), and so forth.

FIG. 3 illustrates a flowchart of an example method 300 for obtaining form data of an online form from a client device via a virtual machine, in accordance with the present disclosure. In one example, the method 300 is performed by a server, such as server 114, server 116, or AS 104 of FIG. 1, or any one or more components thereof, or by any one or more of such servers in conjunction with one another and/or in conjunction with other devices and/or components of system 100 of FIG. 1, e.g., device 110 or device 112, and so forth. In one example, the steps, functions, or operations of method 300 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and proceeds to step 310.

At step 310, the processing system (e.g., of a server) obtains from a client device, an input to access an online form. For example, the processing system may receive a request from an application of the client device for a webpage that is hosted by the processing system (e.g., the server). The application of the client device may comprise a web browser, a mobile device or smartphone app, or the like. Accordingly, the processing system may provide the webpage to the application of the client device, which may then present the webpage via a display screen of the client device. In addition, the webpage may include an option to access the online form, where the input may comprise a selection of the option to access the online form. For instance, a user of the client device may select a button of a webpage via a mouse click or other input to indicate the intention to access the online form. For example, the client device may have an established session or may be otherwise interacting with one or more webpages of a website that is provided by the server (e.g., an online shopping website, a reservation website, a banking website, etc.). One or more of the webpages may provide a button or other element that indicates that an online form may be accessed via such an element. Thus, a user may select a button, for example, that will initiate the obtaining of the online form via the subsequent steps.

At step 320, the processing system obtains a verification that an instantiation of a virtual machine (VM) on the client device is permitted for accessing the online form. For example, the server may obtain a notification from the client device of the selection of the button or other element. In response, the server may provide a dialog to the client device to request authorization to instantiate the VM for accessing the online form. For instance, an example dialog may be such as illustrated in stage 220 of FIG. 2. Accordingly, step 320 may include obtaining a notification from the client device of a user input that indicates that permission to instantiate the VM is granted. It should be noted that in one example, one or more of the webpages of the main session may include code, one or more scripts, or the like for presenting a dialog for a user to provide verification/permission. In other words, the selection of a button or other elements to access the online form may result in the client device presenting the dialog in accordance with code, scripts, or the like that are already possessed by the client device (e.g., without an additional request and response from the server).

At optional step 330, the processing system may verify resources of the client device (e.g., a web browser or other applications thereof) that is accessing the webpage provided by the processing system. For instance, in addition to obtaining permission to instantiate the VM at the client device, the processing system may also verify that the client device is capable of hosting the VM. In one example, optional step 330 may include obtaining information about the client device, such as the type of device (e.g., personal computer, laptop computer, tablet, smartphone, etc.), a manufacturer and/or a model type of the device, the number of processor cores, the available memory, the operating system, the operating system version, the type(s) of user input components, information regarding a NIC of the device, and so forth. For instance, different versions of the VM may be available for different types of client devices, client devices with different capabilities, etc.

At step 340, the processing system provides a configuration code for the VM to the client device. Accordingly, the client device may establish the VM in accordance with the configuration code. In one example, the VM may be configured with isolated processor resources of the client device, isolated memory resources of the client device, and isolated network interface (NIC) card resources of the client device. The isolated processor resources may be physically isolated and may comprise at least one core of a multi-core processor of the client device, or at least one dedicated processor (e.g., where the client device has multiple processors). The isolated memory resources may be physically isolated and may comprise a range or block of a memory, an entire physical memory unit (e.g., where the device has multiple physical memory units), etc. The isolated NIC resources may be physically isolated and may comprise at least one NIC, where the client device may have multiple NICs, or may comprise at least one port (e.g., of a multi-port NIC) that is dedicated to the VM. The isolated NIC resources may alternatively or additionally comprise a NIC partition, e.g., a virtual NIC or "port partition."

It should be noted that the "isolated" processor, memory, and NIC resources may be distinct from and/or segregated from other processor, memory, and NIC resources of the client device that may be used by other programs, modules, or components of the client device, such as by a host operating system (OS), any applications or programs running via a host OS, any other VMs (or any applications or programs running via such other VM(s)), any "containers" operating via the client device, and so forth. For instance, as noted above in connection with step 310, a user of the client device may select a button of a webpage via a mouse click or other input to indicate the intention to access the online form. For example, the user may utilize a web browser that is operating via a host OS to obtain and interact with the webpage, where the web browser (and/or the host OS may utilize processor resources, memory resources, and NIC resources of the client device that are distinct from the isolated processor resources, memory resources, and NIC resources that are dedicated to the VM).

In one example, the VM may be configured with a restriction to communicate with a single IP address. In one example, the VM may be configured to disable a screen capture feature of the client device and/or to disable a clipboard feature of the client device. In addition, in one example, the VM may be configured to establish a secure connection to a controller of a user input component of the client device. For instance, the secure connection to the controller may use a one-time scrambling code that is associated with the VM, where data from the user input component is passed to the VM via the controller in accordance with the one-time scrambling code.

At step 350, the processing system provides the online form to the VM via the client device (e.g., via the hardware resources thereof that are allocated to the VM, via any hypervisor layers that may be utilized to route data to the VM memory resources, etc.), when the virtual machine is instantiated on the client device in accordance with the configuration code. The online form may be to enter at least one of: payment information, personal information, or other sensitive data. It should be noted that in one example, the online form may be provided as part of the VM configuration code. However, in another example, the VM may request the online form from the processing system (e.g., the server) via the client device (after the VM in instantiated by allocating processor resources, memory resources, NIC resources, etc.). It should be noted that the VM is distinct from the application, e.g., insofar as it may use isolated resources of the processing system that are inaccessible to the application (and that are inaccessible to other applications, the host OS, etc. that are also operating on the processing system and/or the client device). Accordingly, the online form, inputs entered thereon, and so forth may be inaccessible to the application.

At step 360, the processing system obtains form data of the online form from the VM via the client device. In one example, the providing the online form of step 350 and the obtaining the form data of step 360 is through a first tunnel (e.g., a secure tunnel) between the processing system and the VM. In one example, the first tunnel is within a second tunnel for a session between the client device (and/or the web browser or other applications) and the processing system (e.g., the main/primary session for obtaining the input to access the online form). In one example, the second tunnel for the main session may also comprise a secure tunnel. For instance, the first tunnel between the processing system and the VM may use a separate key, or set of keys, that is distinct from a key, or a set of keys, for the second tunnel for the (main) session between the client device and the processing system. In addition, the key (or set of keys) for the first tunnel may be held in a memory portion of the client device that is dedicated to the VM and isolated from other resources of the client device.

At optional step 370, the processing system may transmit an instruction to the client device to tear-down the virtual machine, e.g., in response to obtaining the form data.

At step 395 the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 350 and 360 for additional forms relating to a same transaction, steps 310-360 or steps 310-370 for a different interaction with a different client device, and so on. In one example, step 330 may be performed prior to step 310, or between steps 310 and 320. In one example step 340 may be performed before optional step 330. In one example, a verification may be performed client-side where the processing system sends the configuration code and the client device provides a user with an allow/deny choice (e.g., via InstallShield, or the like). In addition, the client device may determine whether it is capable of hosting the VM or not. In this case, step 320 may also be omitted. Thus, these and other modifications are all contemplated within the scope of the present disclosure.

FIG. 4 illustrates a flowchart of an example method 400 for transmitting form data of an online form from a client device to a server via a virtual machine, in accordance with the present disclosure. In one example, the method 400 is performed by a client device, such as device 110 or device 112 of FIG. 1, or any one or more components thereof, or by one of such devices in conjunction with one with other devices and/or components of system 100 of FIG. 1, e.g., server 114, server 116, and/or AS 104, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a client device) obtains an input to access an online form. For example, the processing system may obtain a webpage from a server via an application of the client device and present the webpage via a display screen of the processing system and/or the client device. For instance, the application may comprise a web browser, a mobile device or smartphone app, or the like. In addition, the webpage may provide an option to access the online form, where the input may comprise a selection of the option to access the online form. For example, a user may tap or click a button via a mouse, a touchscreen or the like, may press a key of a keyboard, etc.

At step 415, the processing system (and/or the web browser or other applications thereof) submits the input to the server.

At step 420, the processing system obtains, from the server, a configuration code for a virtual machine (VM).

At optional step 425, the processing system may confirm a permission to instantiate the VM on the client device. For instance, the processing system may present a confirmation dialog and obtain an input confirming the permission.

At step 430, the processing system instantiates the VM in accordance with the configuration code, where the VM is distinct from the application. For example, step 430 may be performed via a hypervisor, or VMM, that is running on the processing system (of the client device). The VM is distinct from the application insofar as it may use isolated resources of the processing system that are inaccessible to the application (and that are inaccessible to other applications, the host OS, etc. that are also operating on the processing system and/or the client device). For example, the VM may be configured with isolated processor resources of the client device, isolated memory resources of the client device, and isolated network interface card resources of the client device. In one example, the VM may be configured with a restriction to communicate with a single IP address (e.g., associated with the server). In one example, the VM may be configured to disable a screen capture feature of the client device and/or to disable a clipboard feature of the client device. In addition, in one example, the VM may be configured to establish a secure connection to a controller of a user input component of the client device (e.g., a keyboard, a mouse, a joystick, a touch-screen, etc.). For instance, the secure connection to the controller may use a one-time scrambling code that is associated with the VM, where data from the user input component is passed to the VM via the controller in accordance with the one-time scrambling code.

At optional step 435, the VM may obtain the online form from the server via the processing system (e.g., via the hardware resources thereof that are allocated to the VM, via any hypervisor layers that may be utilized to route data to the VM memory resources, etc.). For instance, in one example, the obtaining of the online form at optional step 435 may be through a first tunnel between the server and the VM. In one example, the first tunnel is within a second tunnel for a session between the processing system and the server for submitting the input to access the online form to the server. In addition, in one example, the first tunnel between the server and the VM may use a separate set of keys from a set of keys for the second tunnel for the session between the processing system and the server. The online form may be to enter at least one of: payment information, personal information, or other sensitive data. It should be noted that in one example, the VM may request the online form from the server via the processing system (after the VM in instantiated). However, in another example, the online form may be provided as part of the VM configuration code (in which case optional step 435 may not be performed). In addition, as noted above, as part of the VM configuration, NIC resources allocated to the VM may be configured to utilize only one IP address (e.g., the authorized host IP address of the server, or of a related server) for bi-directional communications. Accordingly, at optional step 435, the NIC card resources of the VM may accept inbound communications from that single IP address only. It should also be noted that the online form is inaccessible to the application, the host OS, etc., insofar as the VM is distinct from and/or isolated from processing system resources that are accessible to these entities.

At step 440, the VM presents the online form via the processing system (e.g., via the hardware resources thereof that are allocated to the VM, via any hypervisor layers that may be utilized to route data to the VM memory resources, etc.). For instance, as illustrated in FIG. 2 at stage 230, a separate window may display a user interface that is allocated to the VM, and which may present an online form.

At step 445, the VM obtains form data of the online form via the processing system (e.g., via the hardware resources thereof that are allocated to the VM, via any hypervisor layers that may be utilized to route data to the VM memory resources, etc.). For instance, as noted above, when a VM is operational, the VM may be provided exclusive control of a keyboard, a mouse, a touchscreen, etc. to prevent keyloggers. To illustrate, the VM may establish a secure connection to the keyboard (or other user input device) controller and may temporarily control the outputs of the keyboard bus(es) to alter the values (letters, number, or other characters), transport the scrambled signals securely to the VM (e.g., to the dedicated memory resources of the VM), and then revert these characters back to their intended values.

At step 450, the VM transmits the form data to the server via the processing system (e.g., via the hardware resources thereof that are allocated to the VM, via any hypervisor layers that may be utilized to route data to the VM memory resources, etc.). In one example, the transmitting of the form data at step 450 is through the first tunnel between the server and the VM. As noted above, as part of the VM configuration, NIC resources allocated to the VM may be configured to utilize only one IP address (authorized host IP) for bi-directional communications. Accordingly, at step 450, the NIC card resources of the VM may communicate with that single IP address.

At optional step 455, the processing system may obtain an instruction from the server to tear-down the VM. In one example, the instruction is obtained through the first tunnel between the server and the VM.

At optional step 460, the processing system may tear-down the VM. In one example, the tearing-down of the VM is performed in response to transmitting the form data to the server at step 450. In another example, the tearing-down of the VM may be performed in response to obtaining the instruction at optional step 455. The tearing-down of the VM at optional step 460 may be performed via the hypervisor/VMM that is operating on the client device (e.g., operating on the processing system thereof).

At step 495 the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 435-450 for additional online forms relating to a same transaction, steps 410-450 for an interaction with a different server and/or a different online form, and so on. In one example, the method 400 may be expanded to include verifying that the client device is capable of instantiating and hosting/running the VM. In one example, the method 400 may further include transmitting information regarding the client device to the server (e.g., a device type, a make, a model, an operating system, an operating system version, a number of processor cores, a type of processor, an amount of available memory, NIC information, etc.). In still another example, the method 400 may include obtaining the VM configuration code before step 410 and instantiating the VM at step 430 in accordance with the previously obtained VM configuration code. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIGS. 3 and 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1, or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for obtaining form data of an online form from a client device via a virtual machine or for transmitting form data of an online form from a client device to a server via a virtual machine, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for obtaining form data of an online form from a client device via a virtual machine or for transmitting form data of an online form from a client device to a server via a virtual machine (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for obtaining form data of an online form from a client device via a virtual machine or for transmitting form data of an online form from a client device to a server via a virtual machine (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   obtaining from a client device, by a processing system including at least one processor, an input to access an online form, wherein the client device is accessing a webpage via an application of the client device, wherein the webpage is provided by the processing system and includes an option to access the online form, and wherein the input comprises a selection of the option to access the online form;
   obtaining from the client device, by the processing system, a verification that an instantiation of a virtual machine on the client device is permitted for accessing the online form;
   providing, to the client device by the processing system, a configuration code for instantiating the virtual machine on the client device;
   providing, by the processing system, the online form to the virtual machine via the client device, wherein the virtual machine is instantiated on the client device in accordance with the configuration code, wherein the virtual machine is distinct from the application; and
   obtaining, by the processing system, form data of the online form from the virtual machine via the client device.

2. The method of claim 1, further comprising:
   verifying resources of the client device.

3. The method of claim 1, further comprising:
   transmitting an instruction to the client device to tear-down the virtual machine, in response to obtaining the form data.

4. The method of claim 1, wherein the virtual machine is configured with at least one isolated processor resource of the client device, at least one isolated memory resource of the client device, and at least one isolated network interface card resource of the client device, in accordance with the configuration code.

5. The method of claim 1, wherein at least one of:
   the virtual machine is configured with a restriction to communicate with a single internet protocol address;
   the virtual machine is configured to disable a screen capture feature of the client device; or
   the virtual machine is configured to disable a clipboard feature of the client device.

6. The method of claim 1, wherein the virtual machine is configured to establish a secure connection to a controller of a user input component of the client device, wherein the secure connection to the controller uses a one-time scrambling code that is associated with the virtual machine, wherein data from the user input component is passed to the virtual machine via the controller in accordance with the one-time scrambling code.

7. The method of claim 1, wherein the providing the online form and the obtaining the form data are through a first tunnel between the processing system and the virtual machine.

8. The method of claim 7, wherein a second tunnel is established for a session between the client device and the processing system, wherein the client device accesses the webpage via the application of the client device through the second tunnel, and wherein the input to access the online form is obtained through the second tunnel.

9. The method of claim 1, wherein the online form is to enter at least one of:
payment information; or
personal information.

10. A method comprising:
obtaining, by a processing system of a client device including at least one processor, an input to access an online form, wherein the client device is accessing a webpage via an application of the client device, wherein the webpage is provided by a server and includes an option to access the online form, and wherein the input comprises a selection of the option to access the online form;
submitting the input to the server by the processing system;
obtaining from the server a configuration code by the processing system, wherein the configuration code is for instantiating a virtual machine on the client device;
instantiating the virtual machine by the processing system in accordance with the configuration code, wherein the virtual machine is distinct from the application;
presenting the online form by the virtual machine via the processing system;
obtaining form data of the online form by the virtual machine via the processing system; and
transmitting the form data to the server by the virtual machine via the processing system.

11. The method of claim 10, further comprising:
obtaining the online form from the server by the virtual machine.

12. The method of claim 10, further comprising:
tearing-down the virtual machine.

13. The method of claim 12, further comprising:
obtaining an instruction from the server to tear-down the virtual machine, wherein the tearing-down the virtual machine is performed in response to the instruction.

14. The method of claim 10, further comprising:
confirming a permission to instantiate the virtual machine on the client device.

15. The method of claim 10, wherein the virtual machine is configured with at least one isolated processor resource of the client device, at least one isolated memory resource of the client device, and at least one isolated network interface card resource of the client device, in accordance with the configuration code.

16. The method of claim 10, wherein at least one of:
the virtual machine is restricted to communicate with a single internet protocol address;
the virtual machine is configured to disable a screen capture feature of the client device; or
the virtual machine is configured to disable a clipboard feature of the client device.

17. The method of claim 10, wherein the virtual machine is configured to establish a secure connection to a controller of a user input component of the client device, wherein the secure connection to the controller uses a one-time scrambling code that is associated with the virtual machine, wherein the form data from the user input component is passed to the virtual machine via the controller in accordance with the scrambling code.

18. The method of claim 11, wherein the obtaining the online form and the transmitting the form data are through a first tunnel between the server and the virtual machine, wherein a second tunnel is established for a session between the processing system and the server, wherein the client device accesses the webpage via the application of the client device through the second tunnel, and wherein the input to access the online form is submitted to the server through the second tunnel.

19. The method of claim 10, wherein the instantiating the virtual machine in accordance with the configuration code is performed via a hypervisor running on the processing system of the client device.

20. An apparatus comprising:
a processing system including at least one processor of a client device; and
a computer-readable medium storing instructions which, when executed by the processing system, cause the processing system to perform operations, the operations comprising:
obtaining an input to access an online form, wherein the client device is accessing a webpage via an application of the client device, wherein the webpage is provided by a server and includes an option to access the online form, and wherein the input comprises a selection of the option to access the online form;
submitting the input to a server;
obtaining a configuration code from the server, wherein the configuration code is for instantiating a virtual machine on the client device;
instantiating the virtual machine in accordance with the configuration code;
presenting the online form by the virtual machine via the processing system;
obtaining form data of the online form by the virtual machine via the processing system; and
transmitting the form data to the server by the virtual machine via the processing system.

* * * * *